T. A. C. BOTH.
ELECTRICAL APPARATUS.
APPLICATION FILED NOV. 8, 1910.
1,101,055.
Patented June 23, 1914.
3 SHEETS—SHEET 1.
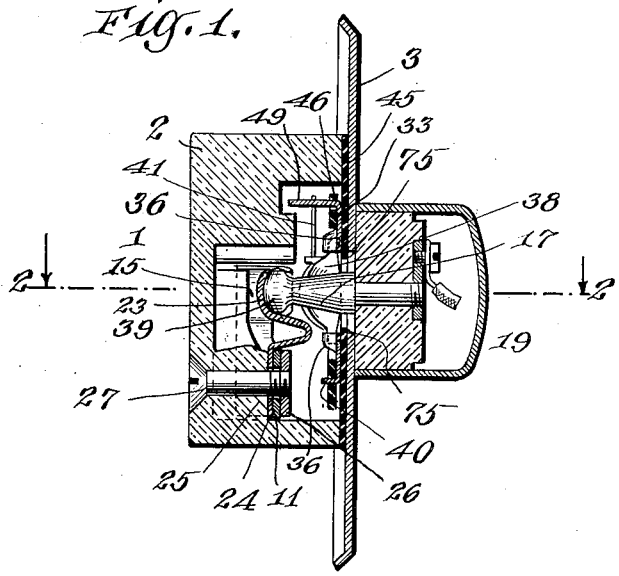
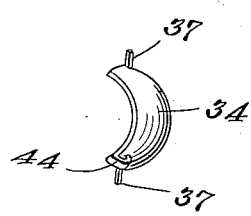
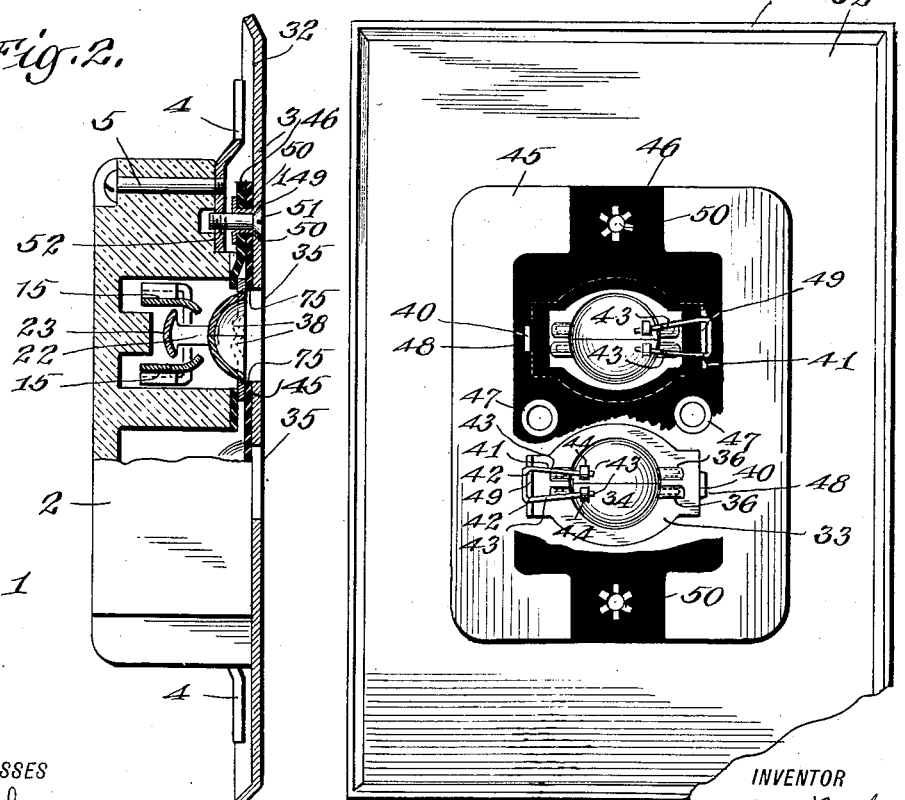
WITNESSES
INVENTOR
Tonjes A. C. Both
BY Alan M. Johnson
ATTORNEY

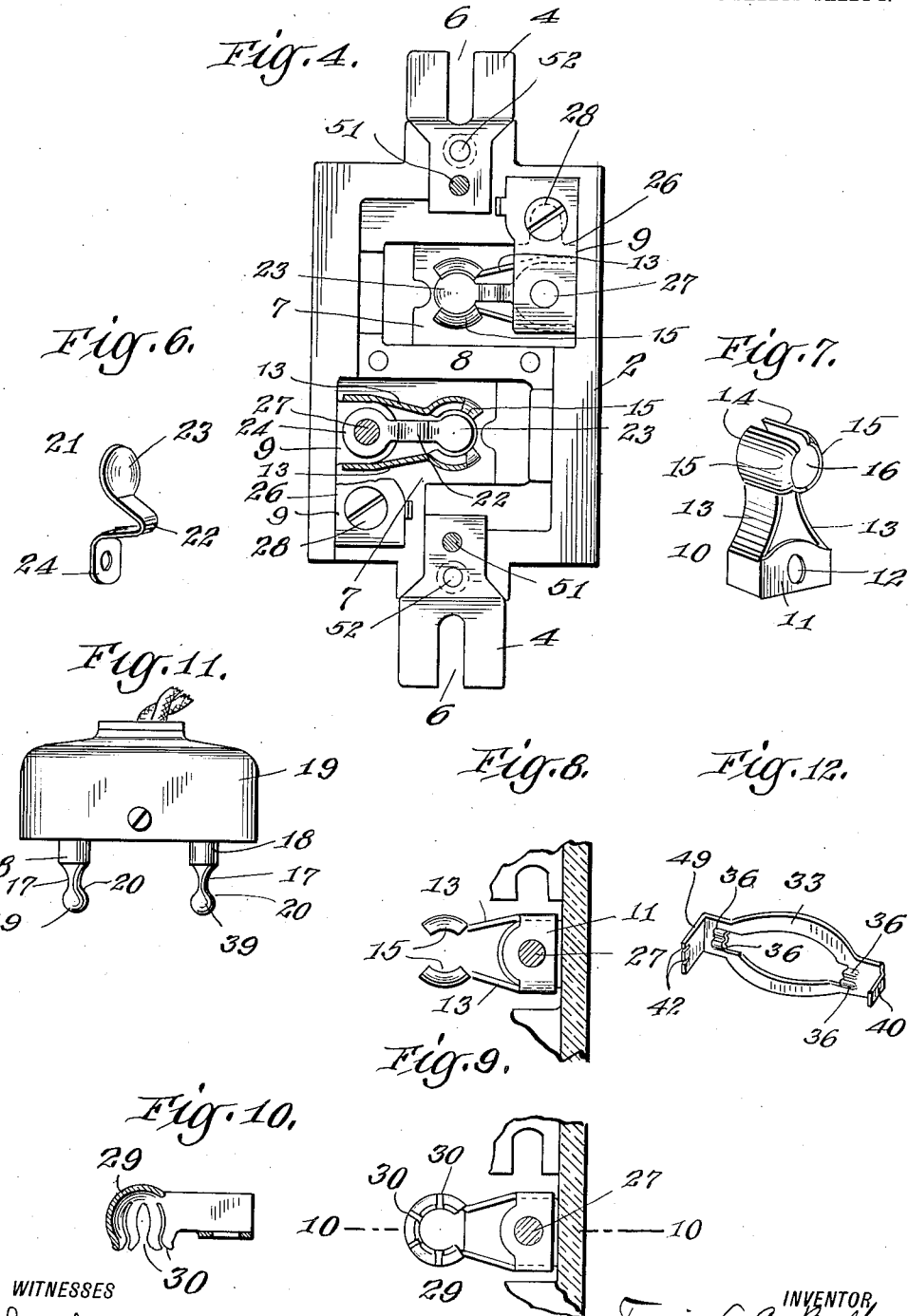

T. A. C. BOTH.
ELECTRICAL APPARATUS.
APPLICATION FILED NOV. 8, 1910.
1,101,055.
Patented June 23, 1914.
3 SHEETS—SHEET 3.
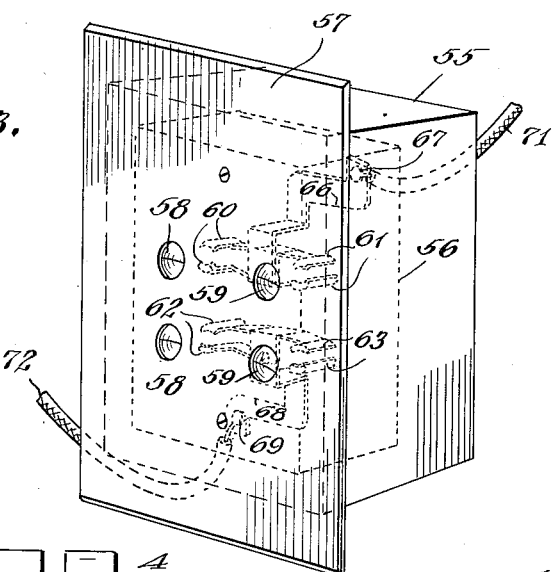
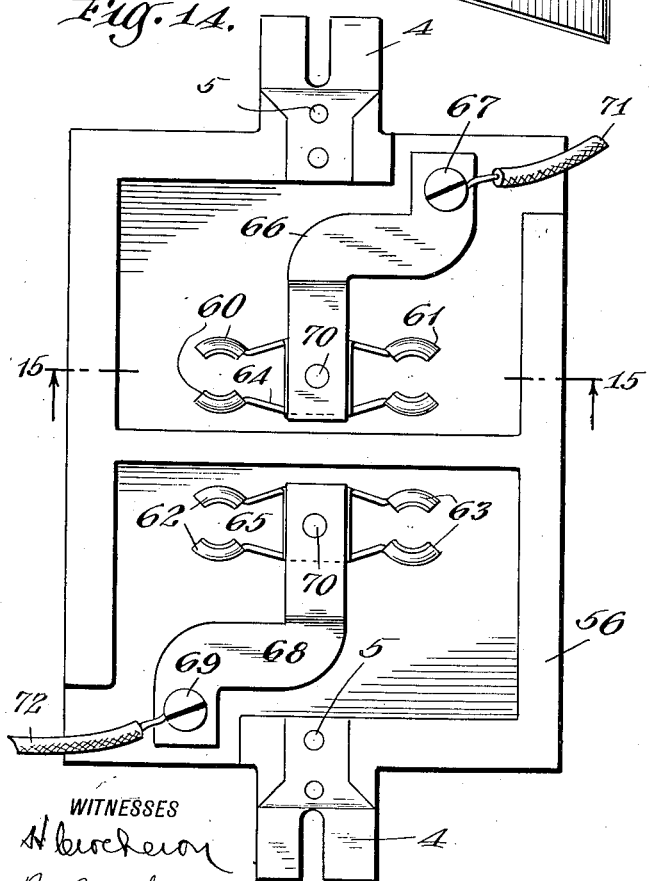
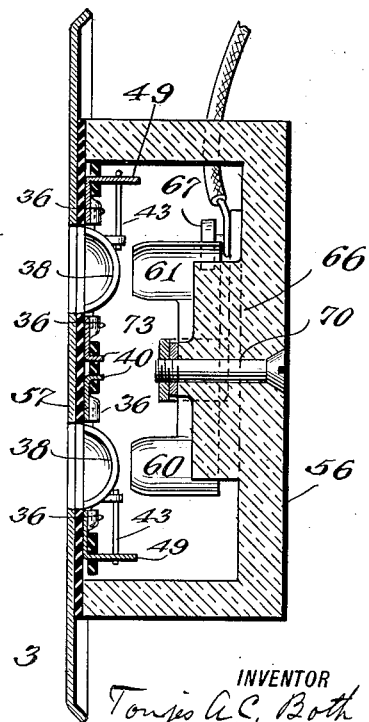

UNITED STATES PATENT OFFICE.

TONJES AUGUST CARL BOTH, OF NEW YORK, N. Y., ASSIGNOR TO IDA S. ROSENHEIM, OF NEW YORK, N. Y.

ELECTRICAL APPARATUS.

1,101,055.          Specification of Letters Patent.     Patented June 23, 1914.

Application filed November 8, 1910. Serial No. 591,241.

*To all whom it may concern:*

Be it known that I, TONJES AUGUST CARL BOTH, a citizen of the United States, and a resident of New York, in the county of New York and State of New York, have invented certain new and useful Improvements in Electrical Apparatus, of which the following is a specification, taken in connection with the accompanying drawings, which form a part of the same.

This invention relates to electrical apparatus and more particularly to flush receptacles and to parts thereof and is an improvement upon U. S. Patent 891,263 granted June 23, 1908 to Ralph A. Schoenberg as the assignee of Charles J. Klein.

My invention relates more particularly to the complete flush receptacle and to the face plate as a separate article of manufacture and to details of construction which will be hereinafter more fully described and pointed out in the claims.

It is well known in this art that flush receptacles are usually used in conjunction with an outlet box which is immovably secured in the walls of a building and around the mouth of which the plaster is flushed. My flush receptacle is ordinarily meant to be mounted within such an outlet box so that its face plate or escutcheon will lie flat upon the wall and give a neat and attractive appearance. But it is to be distinctly understood that my flush receptacle need not be used with such an outlet box, but on the contrary it may be held in the wall in any suitable manner.

My invention further covers the face plate which may be used with my receptacle or with any other suitable one.

In the accompanying drawings showing an illustrative embodiment of my invention and in which the same reference numerals refer to similar parts in the several figures, Figure 1 is a vertical section through the receptacle and the plug; Fig. 2 is a horizontal section substantially on the line 2—2 of Fig. 1, with the omission of the plug, looking down in the direction of the arrows; a portion of the receptacle being shown in side elevation; Fig. 3 is a reverse plan view of the face plate to be used with a single plug; Fig. 4 is a detail plan view of the box or receptacle showing the preferred form of contacts, the face plate and plug being omitted; Fig. 5 is a detail perspective view of one of the shutters or doors; Fig. 6 is a detail perspective view of a portion of one of the contacts; Fig. 7 is a detail perspective view of one of the contacts which may be used separately or in conjunction with the contact shown in Fig. 6; Fig. 8 is a detail fragmentary sectional view of the receptacle, the contact being shown in plan; Fig. 9 is a sectional view through a portion of the receptacle, illustrating in plan a modified form of contact; Fig. 10 is a vertical section through the modified form of contact shown in Fig. 9 on line 10—10; Fig. 11 is a side elevation of a plug; Fig. 12 is a detail perspective view of the pivot plate; Fig. 13 is a perspective view of an outlet box and a modified form of face plate to accommodate two plugs; Fig. 14 is a plan view of the flush receptacle used in the construction shown in Fig. 13, the face plate being omitted; and Fig. 15 is a vertical section on the line 15—15 of Fig. 14, the face plate being shown in position.

In the illustrative embodiments of my invention shown in the drawing, 1 is a flush receptacle including a box or receptacle 2 and a face plate 3. This receptacle 2 may be given various shapes and contours, but preferably I form it of minimum thickness or depth so as to require a very small opening in the wall or a very small outlet box to receive it. This is particularly advantageous where it is necessary to chisel away any brick or masonry to position it, or to receive the outlet box in which it is ordinarily mounted by means of the ears 4, 4 which are secured to the receptacle 2 in any manner such as by means of the screws 5, 5. These ears 4, 4 of the flush receptacle are secured to the support or outlet box by screws or other fastening means, not shown, passing through the slots 6, 6, their heads impinging and binding upon the surface of the ears 4, 4, as is well known in the art.

The receptacle 2 is preferably formed of porcelain or some other insulating material and is provided with a recess 7 which is preferably, though not necessarily, divided into substantially two equal portions by means of a wall 8 so as to permit the different electrical contacts 9 to be mounted in separate compartments of the recess 7 and be insulated from each other. These contacts are a portion of my invention. They consist essentially of a spring contact 10 having a body or connecting member 11 formed with an aperture 12 and with two spring arms 13, 13 which, near their ends, are formed into the semi-circular portions 14, 14, each semi-circular portion being provided with a semi-circular inturned flange 15 leaving an opening 16 between them for the reception of the shank 17 of the studs 18 mounted on the plug 19. These studs are preferably provided with a substantially spherical end 39. The upper surfaces 20, 20 of the spherical end are adapted to lie beneath the inturned semi-circular flanges 15, 15 of the contact 10 and be firmly gripped by said flanges. I preferably make the shank 17 comparatively small in cross section to permit the plug 19 with its studs 18 to have an angular movement within the hemispherical ends 14, 14 of the spring contact without permitting the inturned edges of the flanges 15, 15 contacting with the shank 17. This avoids the necessity of placing any insulation around the studs 18, 18, thereby saving that expense and also the expense of the necessary labor incident thereto. These spring contacts 10 may be used alone as shown for example in Fig. 8, or they may be used in conjunction with the intermediate contact 21, Fig. 6, having a bent stem 22 and a cup shaped end 23. If the intermediate contact member 21 is used its apertured base 24, Figs. 1 and 6, is mounted on the ridge 25 which is preferably formed integral with the box or receptacle 2. Over the base 24 is dropped the contact 10, the binding plate 26 being then mounted above the body member 11 of the contact 10 when all the parts, including the binding plate 26, are secured to each other and to the insulating receptacle 2 by means of the screw 27, or any other suitable securing means. On the binding plates 26, 26 are mounted the binding screws 28, 28.

When the intermediate contact 21 is used, it will be seen that the heads 39 of the studs 18 will make electrical connection not only with the inturned substantially semi-circular flanges 15, 15 of the contacts 10, but in addition thereto with the intermediate contact 21, the bent spring arm 22 serving to force the cup shaped member 3 up into a position where it will be forced downward by the head 39 of the stud 18, when the plug 19 is connected to the flush receptacle. In some cases I may use a contact formed out of a single cup shaped member 29, Figs. 9 and 10 having its edges slotted at 30, 30. It is, of course, to be understood that different feed wires are connected to the respective binding screws 28, 28. With this receptacle I use an improved face plate having a peculiar arrangement of pivoted shutters or doors. It is to be understood, however, that this face plate which is shown reversed in Fig. 3 may be used with other receptacles than that shown in my present application and that my invention covers this face plate as an article of manufacture wherever used, and whether provided with apertures and pivoted doors or shutters for one (Fig. 3) or a plurality of plugs, Fig. 13.

The face plate 3 includes a cover or escutcheon plate 32, a pivoting plate 33, the pivoted shutters or doors 34, 34 and means for normally keeping them closed, together with suitable insulation. The cover plate 32 may be given any suitable shape or configuration to cover any suitable opening or receptacle and may be ornamented in any suitable manner. Preferably it is made of metal and provided with one or more, preferably two, or multiples thereof, apertures 35, 35 beneath which is mounted the pivoting plate 33 which is provided with a plurality of depressions 36, 36 for the reception of the trunnions 37, 37 of the pivoted shutters or doors 34, two such shutters or doors being used to close each opening 35 of the cover plate 32. These doors or shutters are so formed that when the end 39 of the studs 18, or any other suitable member, to be inserted is pressed on their bottom edges 38, 38 the doors automatically swing outwardly upon the trunnions 37, 37 resting in the depressions 36, 36 in the pivoting plate 33 and permit the stud to contact with the electrical contacts carried by the receptacle 2, or any other receptacle, or if not to make an electrical connection, then to perform any other suitable function that may be desired. This pivoting plate 33 is also provided with downwardly extending lugs 49, 49, Fig. 3 and also preferably though not necessarily, with downwardly extending teeth 40, 40. The lugs 49 support the spring members 41 in any suitable manner and these spring members normally close the shutters 34, 34, and protect the contacts in the flush receptacle as well as prevent dust and foreign substances lodging in the receptacle. I preferably form these lugs 49 with small slots or openings 42, 42 for the reception of the bent spring members 41, 41, the arms 43, 43 of the springs cooperating in any suitable manner with the pivoted shutters or doors 34 so as to normally close them. This connection may be formed in various ways. I have found in practice that a cheap and economical manner of connecting them is by forming an arm 44 on the shutter or door to contact with one end 43 of the spring member 41 which is preferably, though not necessarily, in the form of a thin wire.

Between the cover plate 32 and the pivoting plate 33 I mount any suitable insulation, preferably in the form of an insulating disk 45. I also preferably, though not necessarily, use a second insulating disk 46 to cover the pivoting plate 33, said plate lying between the two insulating disks 45 and 46. The pivoting plate and the two insulating disks are connected together in any suitable manner such as by means of rivets 47, 47. The downwardly extending teeth 40 of the pivoting plate 33 are received in openings 48 in the insulated plate 46 and serve to prevent relative movement between the two. The pivoting plate with one or both of the insulating disks is then secured to a cover plate 32 in any suitable manner. A very economical way of securing them together and one which adds to the appearance of the complete face plate 3, is to form one or more additional openings 149, 149 in the cover plate 32 and within this member mount a hollow rivet 50, which serves to secure all members of the face plate 3 together. Through the hollow rivets 50, when it is desired to secure the face plate 3 to a receptacle such as 2, I pass one or more screws or other securing means 51 which coöperate with the screw threaded apertures 52 in the ends of the ears 4.

In mounting the insulating disk 45 I preferably extend it into the apertures 35, Figs. 1 and 2 slightly as at 75 to insure the insulation of the pivoted doors or shutters 34 in whatever position they may assume; and also to prevent the studs 18 making an electrical connection, or short circuit, through the cover plate 32, even though the plug 19 is separated from the face plate 3 by an angular separation due to an angular pull or blow at an angle to the plane connecting the contacts and studs.

My invention also includes a single flush receptacle adapted to accommodate a plurality of plugs, as for example plugs 19, and a face plate having a plurality of sets of openings to receive the studs from two or more plugs at the same time, thereby permitting two different consuming devices to be connected to the contacts in a single flush receptacle at one and the same time. It is often desirable, for example, to use a bed side light and an electric water heater at the same time. When the flush receptacle has a face plate with only one set of openings and one set of electrical connections it is obviously necessary, for example, to disconnect the plug 19 which may be connected to the bed side light while another plug 19, connected to the hot water heater, is inserted in the flush receptacle; which, in this case, would require the user to operate the heater in the dark. Or, again, it is often desirable to use at the same time an electric fan and a portable lamp; or, as in a restaurant, to connect at the same time a fixed fan with a portable dining table lamp, and numerous other examples could be given.

To avoid the additional expense and cumbersomeness of locating two separate outlet boxes at a given location, each with its separate flush receptacle; or, to install a gang or tandem outlet box to receive two separate flush receptacles, and to avoid the necessity of separately wiring each outlet box or each flush receptacle, I combine in one flush receptacle two sets of contacts for two or more plugs, thereby saving expense of installation, preventing the wall from being marred by a plurality of face plates, and greatly increase the convenience of the flush receptacle and the range of different consuming devices which can be used at the same time.

In my invention I may use a single outlet box 55 which is built into or connected to the wall in the usual, or any approved manner, and within this I mount a single receptacle 56 provided with a single face plate 57 having a plurality of openings 58, 58 and 59, 59 registering with different arms 60, 62 and 61 and 63. Arms 60 and 61 are preferably formed out of a single piece of metal and form the contact 64 while the similar contact 65 includes spring arms 62 and 63. The contact 64 is connected to the binding plate 66 on which is mounted the binding screw 67 while the similar binding plate 68 having the binding screw 69 is connected to the contact 65. The contacts and binding plates are secured together and to the receptacle 56 by the screws 70. It is therefore apparent that to each of the feed wires 71 and 72 two contacts are connected, so that in the single flush receptacle two sets of contacts are formed to permit two plugs 19 to coöperate with the single face plate forming a part of the single flush receptacle 56, to the contacts of which are connected the one set of feed wires 71 and 72. In using the plugs it, of course, is understood that one plug will coöperate with the contacts 60 and 62, while the other, if two are used at the same time, will coöperate with the contacts 61 and 63. Each of the apertures 58 and 59 in the face plate 57 is closed by two pivoted shutters 34 mounted on a pivoting plate 73 with insulating disks 45 and 46 in substantially the same manner as in the construction shown in Fig. 3.

Having thus described this invention in connection with several illustrative embodiments thereof to the details of which I do not desire to be limited, what is claimed as new and what it is desired to secure by Letters Patent is set forth in the appended claims:

1. In a flush receptacle the combination of a fixed insulating receptacle, electrical contacts mounted in the receptacle, an apertured face plate, pivoted doors or shutters closing said apertures and opening outwardly, a plug having a fulcrum bearing surface coöperating with the face plate, and means including the electrical contacts mounted in the receptacle and studs carried by the plug permitting the plug to be separated from the receptacle and face plate on a straight or angular separation of the parts.

2. The combination of a fixed flush receptacle including a face plate having outwardly opening closing means operated by the plug, and electrical connecting means carried by the plug and by the flush receptacle, a plug having a fulcrum bearing surface coöperating with the face plate permitting a straight or angular separation of the plug with relation to the receptacle.

3. The combination of a fixed flush receptacle including a face plate having pivoted shutters operated by the plug, and electrical connecting means carried by the plug and by the flush receptacle, a plug having a fulcrum bearing surface coöperating with the face plate permitting a straight or angular separation of the plug with relation to the receptacle.

4. In a flush receptacle the combination of an insulating base or receptacle provided with electrical contacts, a face plate provided with a separate pivoting plate, and outwardly opening pivoted doors or shutters having means to coöperate with the pivoting plate and an insulating disk mounted between the face plate and the pivoting plate.

5. In a flush receptacle the combination of an insulating base or receptacle provided with electrical contacts, a face plate provided with a separate pivoting plate having depressions, outwardly opening pivoted doors or shutters, and means carried by the shutters or doors to coöperate with the depressions in the pivoting plate and an insulating disk mounted between the face plate and the pivoting plate.

6. In a flush receptacle the combination of an insulating box or receptacle provided with electrical contacts, a cover plate, a separate pivoting plate carried by the cover plate, outwardly opening pivoted shutters or doors having means to coöperate with the pivoting plate, and a spring carried by the pivoting plate and adapted to normally close the outwardly moving shutters or doors and an insulating disk mounted between the cover plate and the pivoting plate.

7. A face plate as an article of manufacture comprising a cover plate having apertures, a separate pivoting plate secured to the cover plate and provided with depressions, and a plurality of outwardly opening shutters or doors provided with laterally extending supporting means to be loosely mounted in the depressions in the pivoting plate and an insulating disk mounted between the face plate and the pivoting plate.

8. A face plate as an article of manufacture comprising a cover plate having apertures, a separate pivoting plate secured to the cover plate and provided with depressions, and a plurality of outwardly opening shutters or doors provided with trunnions to be loosely mounted in the depressions in the pivoting plate, and means for normally closing the shutters and an insulating disk mounted between the face plate and the pivoting plate.

9. A face plate as an article of manufacture comprising a cover plate having apertures, a separate pivoting plate secured to the cover plate and provided with depressions and with one or more downwardly extending lugs, a spring carried by the lug or lugs and normally closing the shutters, a plurality of outwardly opening shutters or doors provided with trunnions to be loosely mounted in the depressions in the pivoting plate and an insulating disk mounted between the face plate and the pivoting plate.

10. As an article of manufacture a face plate including an apertured cover plate, a pivoting plate provided with depressions, an interposed insulating disk between the cover plate and the pivoting plate, a plurality of pivoting shutters or doors provided with laterally extending means to rest loosely in the depressions in the pivoting plate, and means to normally close the doors.

11. As an article of manufacture a face plate including an apertured cover plate, a pivoting plate provided with depressions, an interposed insulating disk between the cover plate and the pivoting plate, a plurality of pivoting shutters or doors provided with laterally extending means to rest loosely in the depressions in the pivoting plate, means to normally close the doors and a second insulating disk, the pivoting plate being secured between the two insulating disks.

12. A face plate as an article of manufacture comprising an apertured cover plate, a pivoting plate provided with a plurality of depressions and with one or more downwardly extending lugs, an interposed insulating disk between the cover plate and the pivoting plate, a plurality of outwardly opening doors or shutters having trunnions loosely mounted in the depressions in the pivoting plate, a second insulating disk mounted on the other side of the pivoting plate and one or more springs carried by the downwardly extending lugs, the ends of the springs being adapted to coöperate with coöperating surfaces carried by the outwardly openings shutters or doors to normally close them.

13. A face plate as an article of manufacture comprising an apertured cover plate, a pivoting plate provided with a plurality of depressions and with one or more downwardly extending lugs, an interposed insulating disk between the cover plate and the pivoting plate, a plurality of outwardly opening doors or shutters having trunnions loosely mounted in the depressions in the pivoting plate, a second insulating disk, and one or more springs carried by the downwardly extending lugs, the ends of the spring being adapted to coöperate with the coöperating surfaces carried by the outwardly opening shutters or doors to normally close them, and hollow rivets connecting the insulating disks and pivoting plate to the cover plate.

14. A face plate as an article of manufacture provided with apertures, a pivoting plate provided with depressions, a plurality of outwardly opening shutters or doors having laterally extending means to normally rest in the depressions in the face plate and means to insulate the insulating doors or shutters from the cover plate in all positions which the doors or shutters may assume so as to prevent short circuiting through the cover plate.

15. As an article of manufacture a pivoting plate provided with a plurality of depressions to form pivoting surfaces and with one or more outwardly extending lugs.

16. As an article of manufacture a pivoting plate provided with a plurality of depressions to form pivoting surfaces and with one or more outwardly extending lugs and with one or more outwardly extending teeth.

TONJES AUGUST CARL BOTH.

Witnesses:
ABRAHAM L. BUSH,
BENJ. STRAUSS.